United States Patent [19]

Johnson et al.

[11] 3,999,075

[45] Dec. 21, 1976

[54] CONTROL SYSTEM FOR AN INTEGRAL SPRING-LOADED PARKING AND SERVICE BRAKE

[75] Inventors: Phillip R. Johnson, Decatur; Peter F. M. Prillinger, Peoria Heights; Alfred W. Sieving, Decatur, all of Ill.

[73] Assignee: Caterpillar Tractor Co., Peoria, Ill.

[22] Filed: Aug. 18, 1975

[21] Appl. No.: 605,583

[52] U.S. Cl. .................... 303/63; 188/170; 303/14
[51] Int. Cl.[2] .................................. B60T 7/12
[58] Field of Search .............. 188/170; 192/3 R; 303/2, 9, 10, 13, 14, 57, 59, 63

[56] References Cited
UNITED STATES PATENTS 2,871,066  1/1959  Pannier et al. ............... 303/63
3,547,233  12/1970  Girvan ....................... 188/170
3,759,357  9/1973  Bianchetta ................... 192/3 R Primary Examiner—Duane A. Reger
Attorney, Agent, or Firm—Phillips, Moore, Weissenberger, Lempio & Strabala

[57] ABSTRACT

A control system for a spring-applied service brake which can also be used as a parking brake. Pressure from the vehicle hydraulic system is normally used to release the brakes. In the event of a loss of the primary pressure from the hydraulic system, the control system switches automatically to use of secondary pressure from the vehicle compressed air system to release the brakes, while maintaining the ability of the operator to apply the brakes by normal operation of the service and parking brake controls.

11 Claims, 4 Drawing Figures

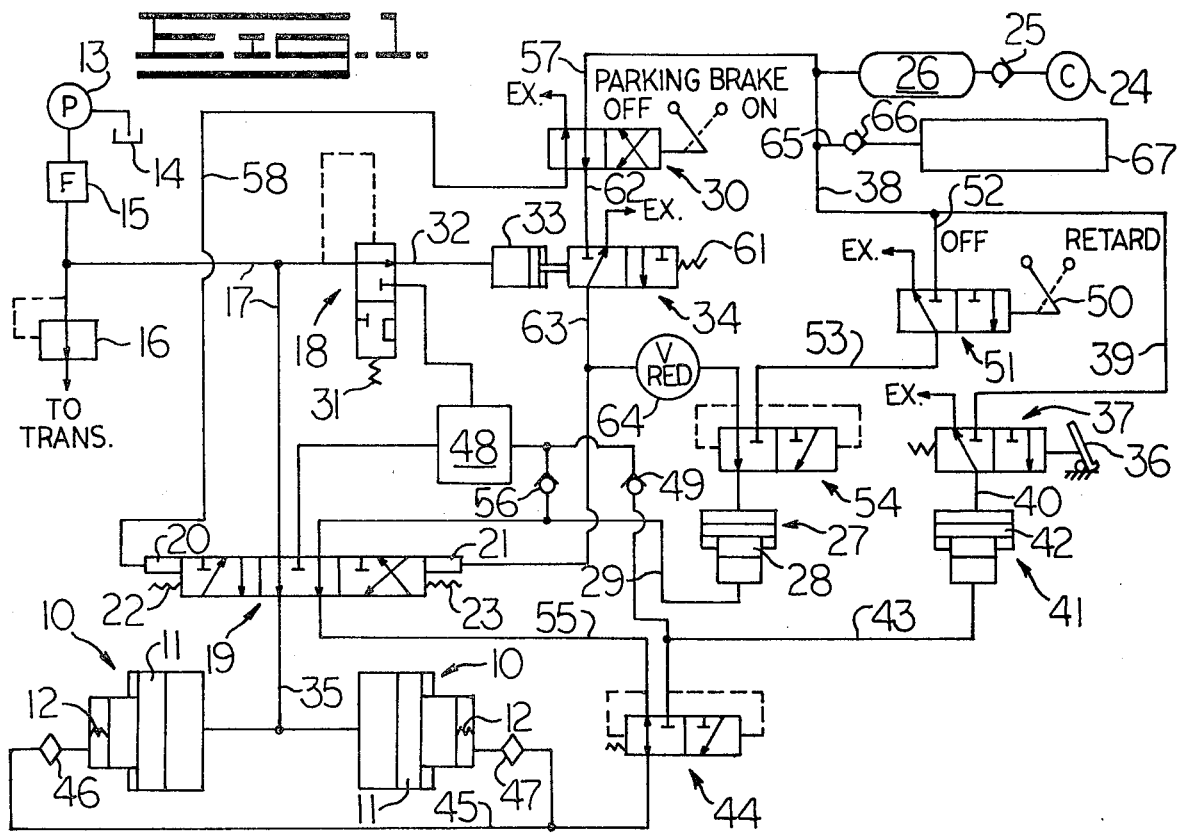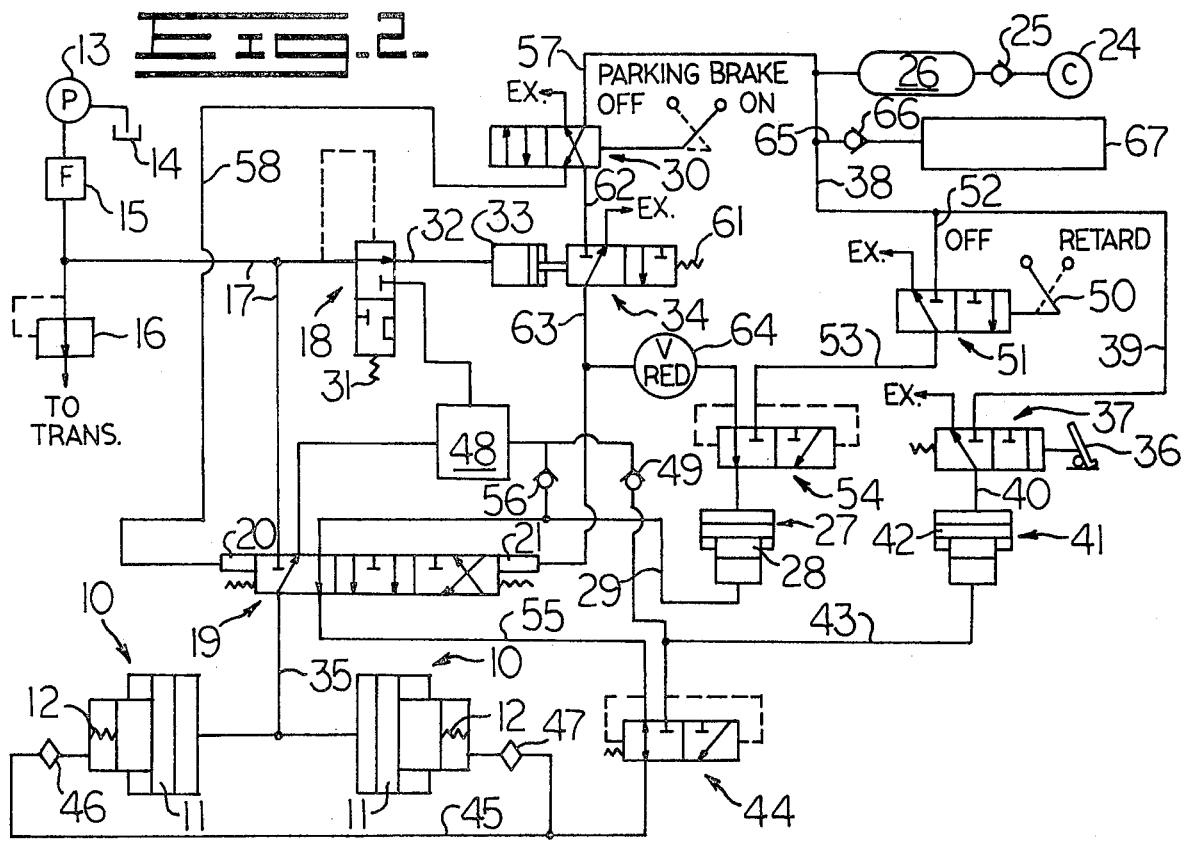

CONTROL SYSTEM FOR AN INTEGRAL SPRING-LOADED PARKING AND SERVICE BRAKE

BACKGROUND OF THE INVENTION

This invention relates to vehicles having hydraulic fluid and compressed air sources and to a braking system for the vehicle, and more particularly to a braking system wherein a single braking device is used for service braking, for retarding, for parking and for emergency operation.

Brake cylinders having a spring-loaded piston therein have been used for such purpose, the piston being biased to a brake-applying position by the spring so that if there is insufficient pressure available from the vehicle pressure system, the brakes will be automatically applied. During normal operation, hydraulic fluid from the fluid system of the vehicle is applied to the brake cylinders to move the piston therein in a direction so that the vehicle brakes are released. The operator can then apply the brakes in service, retarding or parking modes by regulating the resultant fluid pressure in the cylinder on the spring-biased piston therein so that the piston will move either towards brake-releasing or brake-applying positions.

In order to carry out their emergency function, such brake systems are generally designed so that a loss of actuating pressure will cause an automatic application of the brakes. However, rather than having an abrupt braking in the event of emergency, the operator will normally prefer to bring the vehicle to a smooth and controlled stop by means of use of the usual foot pedal normally used for service braking.

Once the disabled vehicle has been brought to a halt it may be necessary to tow the vehicle to a suitable destination for repair work. It is desirable that the brakes can be released without using the normal primary pressure so that the vehicle can be towed. It is also desirable that service and parking brake modes of operation can be carried out while the vehicle is disabled. In order that the operator not have to learn a separate procedure for emergency situations it is preferable that the service and parking brake operations be carried out with the same operator controls and in the same manner whether the vehicle is operating normally or in emergency mode.

BRIEF STATEMENT OF THE INVENTION

The main object of this invention is to provide an improved brake system for stopping a vehicle.

In general, this object is achieved by utilizing the hydraulic fluid system of the vehicle as the primary source of pressure for releasing the brakes during normal operation. Service braking and parking brake operations will be carried out by the operator using the usual foot-controlled service brake pedal and the usual manually operable parking brake control.

In the event of failure of the primary pressure, a pressure-sensing mechanism will sense such pressure loss and switch the system automatically to operation by a secondary pressure source, typically the air pressure system of the vehicle. This secondary pressure source will supply hydraulic fluid under pressure to the brake cylinder to prevent the emergency application of the brakes by the brake spring. The control system while functioning in this secondary mode will then allow the operator to bring the vehicle to a controlled stop by conventional operation of the service brake pedal. Thereafter the parking brake may be set by releasing pressure fluid from the brake cylinder in the same manner as if the brake system were functioning in the primary mode.

In order to release the brakes for towing, the operator simply releases the manual parking brake control as he would if the vehicle were still in the primary mode of operation. The secondary pressure source is utilized to supply hydraulic fluid to the brake cylinders to oppose the bias of the springs and release the brakes. Normal actuation of the service brake control and parking brake control causes the secondary pressure source to perform subsequent braking operations in the same manner as if the vehicle were in the primary mode.

The objects and advantages will become apparent in the course of the following detailed description.

BRIEF DESCRIPTION OF THE DRAWINGS

FIG. 1 is a schematic drawing of a vehicle brake system embodying the principles of the invention, showing the system when the vehicle engine is on with hydraulic pressure present and the parking brake control is in brake-off position.

FIG. 2 shows the system of FIG. 1 when hydraulic pressure is present and the parking brake control is in brake-on position.

FIG. 3 shows the system of FIG. 1 when the engine is off and the parking brake control is in brake-off position.

FIG. 4 shows the system of FIG. 1 when the engine is off and the parking brake control is in brake-on position.

DESCRIPTION OF THE PREFERRED EMBODIMENT

Referring now to FIG. 1, wherein is illustrated a preferred embodiment of the invention, the brake system includes two brake cylinders 10 each having a piston 11 therein biased to braking position by spring 12. Such brake devices are conventional and the apparatus for utilizing movement of the pistons for applying and releasing the vehicle brakes is not shown. Suffice it to say that introduction of fluid pressure of a sufficiently high level into the cylinder on the side opposite from the spring will move the piston against the bias of the spring and release the brake. In normal service braking operation, fluid under pressure will then be introduced into the cylinder on the spring side of the piston to oppose the fluid pressure on the other side thereof so that the spring will move the piston and apply the brakes. Release of fluid pressure from the side of the piston opposite the spring, whether intentional or through loss of vehicle pressure, will allow the spring to apply the vehicle brakes.

The primary apparatus for producing pressurized fluid is pump 13 which is driven by the vehicle engine and which takes hydraulic fluid from reservoir 14 and forces it under pressure through filter 15 and valve 16 to the vehicle transmission system. A portion of this fluid passes through line 17 to the four-way two-position snap-action oil pilot valve 18 and the five-way three-position oil selector valve 19. The latter valve has air-pressured actuators 20 and 21 on each end thereof, the valve being centered in the position shown in FIG. 1 by springs 22 and 23 when neither air-pressured actuator is pressurized.

A secondary apparatus for producing pressurized fluid includes air compressor 24 which is driven by the vehicle engine and delivers air under pressure through check valve 25 to holding tank 26. Air pressure is converted to hydraulic pressure by master cylinder 27 which has an air chamber and an oil chamber therein separated by stepped piston 28. When air pressure is introduced into the cylinder, oil under pressure will be present in outlet line 29 which leads to oil selector valve 19.

The control system includes a manually operable four-way two-position valve 30 for utilizing the vehicle brakes as parking brakes. This valve has a brake-on and a brake-off position, and is preferably interlocked mechanically with the vehicle transmission controls, by means not shown, so that the transmission must be in neutral before the valve can be moved to brake-on position and so that the valve must be moved to brake-off position before the transmission can be shifted from neutral.

FIG. 1 illustrates normal operation wherein the vehicle engine is running so that air pressure is available from compressor 24 and hydraulic pressure is available from pump 13, and the parking brake control is in brake-off position. Hydraulic pressure in line 17 has been exerted on valve 18 so that it has moved against the bias of spring 31 to a position allowing hydraulic fluid to flow through line 32 to the pilot operator 33 of three-way two-position valve 34. The two air-pressured actuators 20 and 21 for valve 19 are vented through valves 30 and 34 respectively so that valve 19 is centered to complete a flow path therethrough to line 35 and both cylinders 10. The brakes are thus held released by the primary pressure.

In the service brake mode of operation, the foot pedal 36 is depressed, shifting valve 37 to the left, so that air under pressure from tank 26 can flow through lines 38 and 39 through valve 37 and line 40 to the air chamber of master cylinder 41. The piston 41 therein will pressure the oil in the hydraulic chamber of the master cylinder and the oil will flow through line 43 to pressure selector valve 44. This valve will shift to the left, allowing fluid to pass therethrough and flow through line 45 and slack adjusters 46 and 47 to both cylinders to cause the brakes to be applied. Release of brake pedal 36 allows the air chamber of master cylinder 41 to vent through valve 37. Hydraulic fluid may now flow back to the master cylinder so that the primary pressure in the brake cylinders will release the brakes. Make-up fluid can pass from the brake oil make-up tank 48 through check valve 49 to line 43 as needed.

In the retarder mode of operation, the retard lever 50 is moved to retard position, shifting valve 51 to the left. This allows air to flow from tank 26, through lines 38 and 52, valve 51 and line 53 to pressure-selector valve 54. This valve shifts to the left so air can then flow therethrough to master cylinder 27. The pressurized oil therein can then flow through line 29, valve 19 and line 55 to valve 44. This valve shifts to the right so that oil can flow therethrough to line 45 and apply the brakes in the same manner as above described. Return of the retard lever to its original position vents the air chamber of master cylinder 27. The hydraulic fluid then flows back to the oil chamber of master cylinder 27 so that the primary pressure in the brake cylinder 10 can fully release the brakes. Make-up fluid from tank 48 can flow through check valve 56 as necessary.

In the event the operator wishes to use the parking brake mode while the engine is still running, the vehicle is stopped and the transmisson control is placed in neutral. The parking brake control may now be moved to brake-on position. Referring now to FIG. 2, air pressure from tank 26 can flow through line 57, valve 30, and line 58 to air-pressured actuator 20, causing the oil selector valve 19 to shift to the right to the position shown in FIG. 2. A fluid flow path is now completed through valve 19 from the cylinder 10 to the low-pressure brake oil make-up tank 48, so that the fluid in the cylinders can drain therefrom. The release of pressure from the cylinders causes the springs 12 to apply the vehicle brakes.

If the manual parking brake control is moved back to brake-off position, valve 30 will be moved back to the position shown in FIG. 1 so that line 58 and actuator 20 are vented. Springs 22 and 23 recenter valve 19 so that primary pressure is again applied through valve 19 to release the brakes. The transmission can now be shifted out of neutral and the vehicle operated as described above in connection with FIG. 1.

Figures 3, 4:
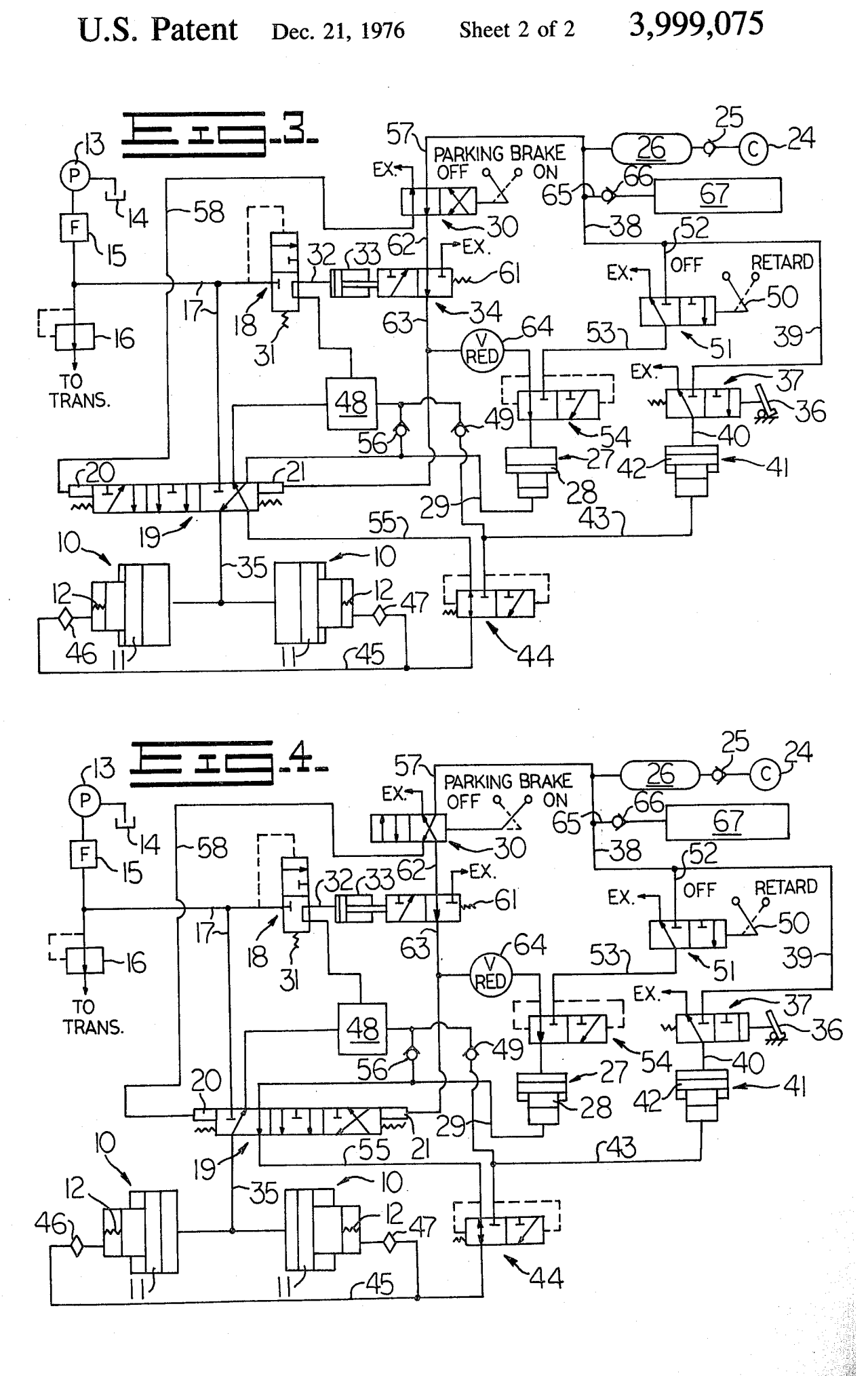

As long as the transmission fluid has sufficient pressure to keep the brake pistons 11 retracted against springs 12 the control system will remain in the primary mode. However, if the transmission fluid pressure starts to decay and decreases to a point where it will not overcome the bias spring 31 of the snap-action pilot valve 18, this valve will shift rapidly, to the position shown in FIG. 3. Fluid will now be blocked by valve 18 and the pilot operator 33 for valve 34 will drain through valve 18 to the make-up tank 48. Spring 61 shifts valve 34 to the left completing a flow line from air tank 26 through valve 30, line 62, valve 34 and line 63 to the air-pressured actuator 21 for oil selector valve 19. At the same time pressurized air passes through reducing valve 64 to pressure selector valve 54 to pressurize the air chamber of master cylinder 27. Pressurized oil flows therefrom through line 29 to oil selector valve 19 which has shifted to the left to complete a fluid flow path from master cylinder 27 to the brake cylinders 10. The pressure fluid from the secondary apparatus thus maintains the brake pistons 11 retracted against springs 12 so that the brakes remain released. The service brake pedal 36 may still be actuated to apply fluid pressure to the spring sides of pistons 11 to brake the vehicle to a stop.

The parking brake can also be actuated when the control system is in the secondary mode of brake piston retraction operation. For instance, suppose there is a loss of primary pressure during movement of the vehicle. Such loss, as described above, causes an automatic switching to the secondary mode of operation so that the service brake can be used to provide normal braking. Once the vehicle is stopped, the transmission control can be shifted to neutral so that the parking brake control may be shifted to brake-on position. This is the situation illustrated in FIG. 4.

With valve 30 now shifted to the brake-on position, valve 30 will direct air from tank 26 to the air-pressured actuator 20, while actuator 21 is vented, causing oil selector valve 19 to move to the right to the parking brake position. Oil can now drain from the retraction side of the brake cylinders 10 through line 35 and valve 19 to the brake oil make-up tank 48, so that the springs 12 will exert force on the pistons 11 to move them to braking position. At the same time the air chamber of master cylinder 27 will be vented through valve 64, line 63, valve 34, line 62 and valve 30 so that the master cylinder piston 28 returns to its unactuated position.

In the event it is desired to tow the vehicle to a place where the engine or primary apparatus may be repaired, the parking brake control is moved to the brake-off position, i.e., back to the position shown in FIG. 3. The air pressure stored in tank 26 will again be applied to air-pressured actuator 21, causing valve 19 to shift to the left, and to master cylinder 27, causing the oil in line 29 to be pressured. This oil will again flow through valve 19 to the retraction side of brake cylinders 10 to cause release of the brakes. The brakes can be applied again, either by actuation of foot pedal 36 or by movement of the parking brake control to brake-on position. The release and reapplication of the brakes in a disabled vehicle can be continued by means of the secondary mode as long as sufficient air pressure is available in the air tank 26.

The system is preferably provided with an air line 65 having a check valve 66 therein to which an auxiliary or external air compressor 67 may be connected. With such a compressor the process of releasing and applying the brakes of a disabled vehicle can be continued as many times as is required.

The present system enables the brake cylinders 10 to be used for service braking, retarding and as parking brakes. A loss of primary pressure causes an automatic switching of operation to the secondary mode so that the brakes remain released while enabling the operator to bring the vehicle to a stop in a usual manner by means of the foot pedal 36. If both primary and secondary pressures fail, the brakes will be automatically applied by means of springs 12. As far as the operator is concerned, service and parking brake operations are the same whether the vehicle is disabled or not. Thus, no different procedure on the operator's part is required to release or apply the brakes in event of an emergency or during subsequent towing of the vehicle.

What is claimed is:
1. A vehicle braking system comprising:
   a. a primary apparatus for producing pressurized fluid,
   b. a secondary apparatus for producing pressurized fluid,
   c. brake means having a cylinder and a spring-biased piston therein and operable such that introduction of pressurized fluid into said cylinder will oppose the bias of the spring and move the piston to brake-off position and release of pressure from said cylinder will allow said spring to move said piston to brake-on position,
   d. conduit means connecting said primary and secondary apparatus to said cylinder,
   e. valve means disposed in said conduit means, said valve means having a first fluid flow path therethrough for releasing pressurized fluid from said cylinder, a separate second fluid flow path for admitting pressurized fluid from said primary apparatus to said cylinder, and a third fluid flow path for admitting pressurized fluid from secondary apparatus to said cylinder,
   f. a manually operable device having brake-on and brake-off positons,
   g. means for actuating said valve means (e) to complete said first flow path therethrough when said manually operable device is in brake-on position,
   h. means responsive to the pressure of fluid from said first apparatus and operable when said manually operable device is in brake-off position for
   1. actuating said valve means (e) to complete said second flow path therethrough when said pressure is above a predetermined value, and
   2. actuating said valve means (e) to complete said third flow path therethrough when said pressure is below a predetermined value.

2. Apparatus as set forth in claim 1, wherein said primary apparatus includes a hydraulic pump, and wherein said secondary apparatus includes a source of pressurized air and pressure conversion means for utilizing pressurized air from said source to pressurize hydraulic fluid for delivery to said cylinder.

3. Apparatus as set forth in claim 2, wherein said means (h) includes an air-pressured actuator for actuating said valve means (e) to complete said third fluid flow path therethrough, wherein said manually operable device (f) comprises a manually operable valve having brake-on and brake-off positions and wherein said manually operable valve is adapted to connect said source of pressurized air and said air-pressured actuator when said manually operable valve is in its brake-off position.

4. Apparatus as set forth in claim 2, wherein said means (g) includes an air-pressured actuator for actuating said valve means (e) to complete said first fluid flow path therethrough, wherein said manually operable device (f) comprises a manually operable valve having brake-on and brake-off positions and wherein said valve connects said source of pressurized air and said air-pressured actuator when said manually operable valve is in brake-on position.

5. Apparatus as set forth in claim 4, wherein said means (h) includes a second air-pressured actuator for actuating said valve means (e) to complete said third fluid flow path therethrough, and wherein said manually operable valve is adapted to connect said source of pressurized air and said second air-pressured actuator when said manually operable valve is in its brake-off position.

6. Apparatus as set forth in claim 5, wherein said means (h) includes a condition-reponsive valve having a first position connecting said manually operable valve to said second air-pressured actuator and a second position venting said second air-pressured actuator, and means responsive to the pressure of fluid from said first apparatus for moving said condition-responsive valve to its first or second positions when said pressure is below or above, respectively, a predetermined value.

7. Apparatus as set forth in claim 6 wherein said means (h) includes spring means for actuating said valve means (e) to complete said second flow path therethrough when neither of said air pressure actuators therefor is connected to said source of pressurized air.

8. Apparatus as set forth in claim 3, wherein said manually operable valve is adapted to connect said source of pressurized air and said pressure conversion means when said manually operable valve is in its brake-off position.

9. Apparatus as set forth in claim 8, wherein said means (h) includes a condition-responsive valve having a first position connecting said manually operable valve to both said second air-pressured actuator and said pressure conversion means and a second position venting both said second air-pressured actuator and said pressure conversion means, and means responsive to the pressure of fluid from said first apparatus for moving said condition-responsive valve to its first or second position when said pressure is below or above, respectively, a predetermined value.

10. Apparatus as set forth in claim 3 wherein said source of pressurized air includes an air compressor and a holding tank for receiving and storing air from said air compressor.

11. Apparatus as set forth in claim 10 wherein said secondary apparatus further includes means for connecting said secondary apparatus to an auxiliary source of pressurized air.

* * * * *

UNITED STATES PATENT AND TRADEMARK OFFICE
CERTIFICATE OF CORRECTION

PATENT NO. : 3,999,075
DATED : December 21, 1976
INVENTOR(S) : PHILLIP R. JOHNSON ET AL It is certified that error appears in the above-identified patent and that said Letters Patent are hereby corrected as shown below:

Column 5, line 58 - "a third fluid flow path" should read
--a separate third fluid flow path--.

Signed and Sealed this twenty-third Day of August 1977

[SEAL]

Attest:

RUTH C. MASON
Attesting Officer

C. MARSHALL DANN
Commissioner of Patents and Trademarks